United States Patent
Grimm et al.

(10) Patent No.: US 9,746,567 B2
(45) Date of Patent: Aug. 29, 2017

(54) SYSTEMS AND METHODS FOR PERFORMING DUAL-SCALE INTERPOLATION

(71) Applicant: CGG SERVICES SA, Massy Cedex (FR)

(72) Inventors: Johannes Grimm, Calgary (CA); Lynn Burroughs, Calgary (CA)

(73) Assignee: CGG SERVICES SAS, Massy (FR)

( * ) Notice: Subject to any disclaimer, the term of this patent is extended or adjusted under 35 U.S.C. 154(b) by 549 days.

(21) Appl. No.: 14/167,531

(22) Filed: Jan. 29, 2014

(65) Prior Publication Data
US 2014/0286128 A1 Sep. 25, 2014

Related U.S. Application Data

(60) Provisional application No. 61/804,372, filed on Mar. 22, 2013.

(51) Int. Cl.
*G01V 1/28* (2006.01)

(52) U.S. Cl.
CPC ............ *G01V 1/28* (2013.01); *G01V 2210/57* (2013.01)

(58) Field of Classification Search
CPC ....... G01V 1/364; G01V 1/28; G01V 2210/57
USPC .................................................... 367/24, 43
See application file for complete search history.

(56) References Cited

U.S. PATENT DOCUMENTS

| | | | | |
|---|---|---|---|---|
| 4,800,539 A * | 1/1989 | Corn | ........................ | G01V 1/34 367/68 |
| 5,617,372 A * | 4/1997 | Gulunay | .................. | G01V 1/28 367/38 |
| 5,995,906 A * | 11/1999 | Doyen | ................... | G01V 11/00 702/16 |
| 8,301,429 B2 * | 10/2012 | Hajibeygi | ........... | G06F 17/5018 702/127 |
| 8,705,317 B2 * | 4/2014 | Houck | ................... | G01V 1/301 367/73 |
| 2008/0144436 A1* | 6/2008 | Pickering | ................. | G01V 1/30 367/21 |

OTHER PUBLICATIONS

R. Abma et al., "3D Interpolation of Irregular Data with a POCS Algorithm", GEOPHYSICS, Nov.-Dec. 2006, pp. E91-E97, vol. 71, No. 6.

(Continued)

*Primary Examiner* — Daniel L Murphy
(74) *Attorney, Agent, or Firm* — Patent Portfolio Builders PLLC

(57) ABSTRACT

Systems and methods are provided for processing seismic data and displaying an output associated with the seismic data. A method includes: separating the seismic data into a fine-scale dataset and a coarse-scale dataset, wherein each dataset includes a non-zero portion of the data; applying a first interpolation to the coarse-scale dataset which results in an interpolated coarse-scale dataset; applying a second interpolation to the fine-scale dataset which results in an interpolated fine-scale dataset, wherein the first and second interpolation are different interpolations; summing together the interpolated coarse-scale dataset and the interpolated fine-scale dataset which results in a summed interpolated dataset; and displaying at least one image based on the summed interpolated dataset.

20 Claims, 24 Drawing Sheets

(56) References Cited

OTHER PUBLICATIONS

P. Cary et al., "5D Leakage: Measuring What 5D Interpolation Misses", SEG Las Vegas 2012 Annual Meeting, Nov. 4-9, 2012, pp. 1-5.
A. Klokov et al,, "Separation and Imaging of Seismic Diffractions in Dip Angle Domain", 72nd EAGE Conference & Exhibition Incorporating SPE EUROPEC 2010, Barcelona, Spain, Jun. 14-17, 2010.
B. Liu et al., "Minimum Weighted Norm Interpolation of Seismic Records", GEOPHYSICS, Nov.-Dec. 2004, pp. 1560-1568, vol. 69, No. 6.
D. Trad, "Five-Dimensional Interpolation: Recovering from Acquisition Constraints", GEOPHYSICS, Nov.-Dec. 2009, pp. V123-V132, vol. 74, No. 6.
S. Trickett et al., "Rank-Reduction-Based Trace Interpolation", SEG Denver 2010 Annual Meeting, Oct. 15-22, 2010, pp. 3829-3833.
S. Xu et al., "Antileakage Fourier Transform for Seismic Data Regularization in Higher Dimensions", GEOPHYSICS, Nov.-Dec. 2010, pp. WB113-WB120, vol. 75, No. 6.
S. Xu et al., "On the Orthogonality of Anti-Leakage Fourier Transform Based Seismic Trace Interpolation", SEG International Exposition and 74th Annual Meeting, Denver, Colorado, Oct. 10-15, 2004.
R. Zhang, "Imaging the Earth Using Seismic Diffractions by Means of Radon Transform", 2005 CSEG National Convention, pp. 318-321.

\* cited by examiner

122

126

130

132

134

138

142

SYSTEMS AND METHODS FOR PERFORMING DUAL-SCALE INTERPOLATION

RELATED APPLICATIONS

The present application claims priority under 35 U.S.C. §119(e) to U.S. Provisional Patent Application Ser. No. 61/804,372, filed Mar. 22, 2013, for "Dual-Scale Interpolation", the entire contents of which are expressly incorporated herein by reference.

TECHNICAL FIELD

The embodiments relate generally to seismic exploration methods and systems and, more particularly, to methods and systems for improving interpolation of seismic data.

BACKGROUND

Seismic waves generated artificially for the imaging of geological layers have been used for more than 50 years. During seismic explorations, as shown in FIG. 1, a controlled source 2 generates seismic waves 4, which propagate through the earth. Some of these seismic waves are reflected at the interface(s) 6 between different geological layers, e.g., geological layer 8 and geological layer 10. As the reflected waves 12 return to the surface of the ground 16, the waves are detected by receivers 14 which convert the seismic energy into an electrical signal which is then recorded by recording equipment. Analysis of travel times and amplitudes of these waves makes it possible to construct a representation of the geological layers on which the waves reflect.

When a seismic survey is conducted on land, the seismic source is usually a controlled explosion, a vibrator, or a weight-drop. When the seismic survey is conducted in a marine environment, the seismic source is typically an air gun. For the explosive source type, dynamite is buried in a hole several meters deep. The hole is filled in and then the dynamite is detonated. Vibrator sources work by shaking the ground for several seconds, at a variety of frequencies. Weight-drop sources involve dropping a large weight onto the ground. Air guns are positioned beneath the surface of the water, where they release a burst of compressed air to generate acoustic waves. Other source types, such as, using the earth's natural rumblings as a passive source, can also be used. However, land seismic surveys predominantly use either explosive or vibrator sources, while marine surveys predominantly use air guns.

For land seismic surveys, geophones are used as receivers. Geophones convert the ground displacement (caused by the elastic seismic waves) into a voltage. For marine surveys, hydrophones, which are also used as receivers, convert pressure changes (such as those caused by underwater sound waves) into an electrical signal. For both types of receivers, the variation of the received signal from a baseline is recorded digitally. This recording from one receiver is called a seismic trace. A seismic trace generally extends over several seconds of listening time.

Seismic waves that are reflected once from an interface are called primary reflections and are of value when trying to construct a representation of the geological layers. An example of this is shown in FIG. 2 wherein if the interface 6 is smooth and continuous at the point of reflection 18, the angle 22 at which the wave reflects is equal to its angle of incidence 20. These so-called "specular reflections" are used to construct the coarse-scale features of the layers, i.e., the general structure and global trends of the layers. If the point of reflection 24 is a discontinuity, a diffraction results, in which the incident energy is scattered in all directions. Diffractions indicate the presence of fine-scale features such as faults, fractures and abrupt edges.

Numerous other waves arrive at and are recorded by the receiver(s) 14. For example, air blast noise refers to waves generated by the source which travel through the air to the receiver 14. Ground roll waves are source-generated waves that propagate along the surface of the ground. Multiples are waves that are reflected more than once. Background noise encompasses non-source-generated waves, such as, from wind, rain, ocean waves, power lines, traffic, humans, animals as well as noise generated by the recording instruments and receivers. A goal of seismic processing is to extract the useful energy from the seismic traces and to infer from that energy, a picture of the layers beneath the sources and receivers.

Many seismic processing algorithms make the simplifying assumption that the waves arriving at the receiver are plane waves. A plane wave is a theoretical construct that has a wavefront with no curvature, i.e., the wavefront is planar. This assumption is approximately realistic for seismic data because the distances between source and receiver are typically large distances. The actual wavefront has a large enough radius that the portion of the wavefront that reaches the receiver is very near planar.

To differentiate signal from noise, seismic experiments employ a high degree of redundancy. That is, a seismic survey attempts to sample each reflection point many times. To accomplish this, seismic waves generated by a single source point are recorded at many receiver locations, and the experiment is repeated for many source locations. As shown in FIG. 3, current land three dimensional (3D) seismic methods lay out receivers over the survey area in an organized grid made up of receiver lines, while source points are laid out on an overlapping grid make up of shot lines. The term offset is used herein to refer to the distance between a source and a receiver. Azimuth is the angular direction, in degrees measured from north, between a source and receiver. The "inline" direction is parallel to the receiver lines, while the "crossline" direction is perpendicular to the receiver lines. FIG. 3 shows an orthogonal survey 26 in which the shot lines 28 are orthogonal to the receiver lines 30. In FIG. 3, the receiver lines 30 have black triangles representing the receivers and the shot lines 28 have circled asterisks representing the shots. A common midpoint (CMP) grid 32 overlays the orthogonal survey 26.

In seismic surveys, the source and receiver locations are known but the point of reflection is not known. Seismic processing methods initially assume that the reflection point occurs midway between the source and receiver. The survey area is divided into a grid of CMP bins, e.g., bins 34 and 36, as shown in FIG. 3, and the seismic traces are each assigned to the bin containing the seismic trace's midpoint. Seismic traces that fall into the same CMP bin form a CMP gather. The number of traces in a gather is called the gather's fold. Traces in one CMP gather can be further organized by their respective offsets and azimuths. Alternatively, the traces in one CMP gather can be organized into "common offset vectors" (COVs), by replacing offset and azimuth with a 2-component offset vector. The first component is the offset in the inline direction and the second component is the offset in the crossline direction.

Redundancy provides an opportunity to examine how amplitudes in a CMP gather vary with changing offset and azimuth. In general, longer offsets imply smaller angles of incidence. The amount of reflected energy at an interface changes with angle of incidence and is measured by changes in amplitudes of the seismic traces in a CMP gather. An amplitude-versus-offset (AVO) analysis can infer properties of the interface, including rock density, porosity and fluid content. Amplitude-versus-azimuth (AVAz) analysis infers fracture orientation and other heterogeneities within layers. To provide an image of the subsurface, however, the redundancy is removed with a "stacking" process, which averages all traces in each gather after correcting for their different travel paths. Stacking is a powerful tool for removing noise, while reinforcing reflected signal(s).

The initial assumption that reflection points lie midway between the source and receiver is not true in general. When a geological layer 38 is perfectly flat and the layer(s) above are homogeneous, as shown in FIG. 4, the reflection point 42 is beneath the midpoint 40. Layer 46, which is dipping with respect to the surface 45 as shown in FIG. 5, tends to have reflection points that are not beneath the midpoints. Geological layers which are non-homogeneous, in particularly those for which the variations cause waves to be transmitted at different velocities, may also give reflection point(s) 44 at location(s) other than the midpoint 48. Processing of seismic data usually includes a seismic migration step in which a migration algorithm moves the energy from the common midpoint to the actual reflection point 44. Migration algorithms also collapse diffractions to their scattering point. Migration algorithms are categorized by where they are performed in the processing sequence relative to the stacking step. A pre-stack time migration (PSTM) performs migration on the CMP gathers prior to stacking.

For optimal imaging, PSTM algorithms generally require a uniform sampling of offsets and azimuths for each CMP. However, orthogonal land seismic surveys often produce data that is sparsely and irregularly sampled in the offset and azimuth dimension due to high cost and access restrictions in the field. One method to ameliorate this issue is to use a so-called "5 dimensional (D)" interpolation, which mathematically reconstructs the missing traces to provide the regular and uniform spatial sampling in four spatial dimensions that benefits pre-stack migration. Five dimensional (5D) interpolation can also provide better conditions for AVO and AVAz analysis. One problem associated with 5D interpolation in general is that fine-scale details, e.g., diffractions and noise, may not interpolate well. While these details are not lost on the original traces, their energy becomes diluted when migrated with the interpolated traces.

There are several 5D interpolation algorithms in commercial use, including Minimum Weighted Norm Fourier Interpolation (MWNI) (LIU, B and SACCHI, M., 2004, "Minimum weighted norm interpolation of seismic records," Geophysics, 69, pp. 1560-1568; TRAD, D., 2008, "Five-dimensional seismic data interpolation," 78th Annual International Meeting," SEG, Expanded Abstracts, pp. 978-982), Anti-Leakage Fourier Transform (ALFT) (XU, S., ZHANG, Y., and LAMBARE, G., 2004, "On the orthogonality of anti-leakage Fourier transform based seismic trace interpolation," 74th Ann. International Meeting" SEG, Expanded Abstracts (SP 3.7; XU, S., ZHANG, Y., and LAMBARE, G., 2010, "Antileakage Fourier transform for seismic data regularization in higher dimensions," Geophysics 75, WB113-120) and Projection onto Convex Sets (POCS) (ABMA, R. and KABIR, N., 2006, "3D interpolation of irregular data with a POCS algorithm," Geophysics 71, E91-E97). All these methods rely on the idea that the wavefield to be reconstructed is a superposition of plane waves. Cadzow interpolation (TRICKETT, S., BURROUGHS, L., and MILTON, M., 2010, "Rank-reduction-based trace interpolation," 80th Annual International Meeting, SEG, Expanded Abstracts, pp. 3829-3833) is potentially more flexible. Nevertheless, Cadzow interpolation's well understood properties also assume a plane-wave model.

Interpolation methods based on plane waves are good at reconstructing smooth global trends, however they are not efficient at reconstructing the fine-scale features that provide spatial resolution. This can be demonstrated by comparing a 3D model which includes two coarse-scale events and one fine-scale feature. A cross section from the 3D model is shown in FIGS. 6-9. FIG. 6 shows a model 50 with three events, two coarse-scale events 52, 54 and one fine-scale event 56. FIG. 7 shows a cross-section 58 from a 3D volume in which the volume is decimated. In FIG. 8, the data has been reconstructed using a 3D interpolation algorithm resulting in the image 60. FIG. 8 shows that while the interpolation used performed well when reconstructing the coarse-scale events, the fine-scale event is smeared in space with the amplitude of the fine-scale event being weakened. In FIG. 9, the map view 62 of the model shows the size of the fine-scale event 64 relative to the rest of the area 66 of the map view of the model.

A problem with currently used methods for 5D interpolation can be seen with respect to FIG. 9 in which the map view of the reconstruction of the fine-scale feature 64 is negatively influenced by the large number of surrounding traces that contain no information about the fine-scale feature. However, the surrounding traces support the reconstruction of the coarse-scale events.

Accordingly, it would be desirable to provide methods and systems that avoid the afore-described problems and drawbacks.

SUMMARY

According to an embodiment, there is a method for processing seismic data and displaying an output associated with the seismic data, the method including: receiving, by an interface, the seismic data; separating, by a processor, the seismic data into a fine-scale dataset and a coarse-scale dataset wherein each dataset includes a non-zero portion of the data; applying, by the processor, a 5D interpolation to the coarse-scale dataset which results in an interpolated coarse-scale dataset; applying, by the processor, one of a 3D, a 4D or a 5D interpolation to the fine-scale dataset which results in an interpolated fine-scale dataset; summing together, by the processor, the interpolated coarse-scale dataset and the interpolated fine-scale dataset which results in a summed interpolated dataset; regularizing and preparing, by the processor, the summed interpolated dataset for prestack migration; and displaying, by a display, at least one image based on the summed interpolated dataset.

According to an embodiment, there is a method for processing seismic data and displaying an output associated with the seismic data, the method including: separating the seismic data into a fine-scale dataset and a coarse-scale dataset, wherein each dataset includes a non-zero portion of the data; applying a first interpolation to the coarse-scale dataset which results in an interpolated coarse-scale dataset; applying a second interpolation to the fine-scale dataset which results in an interpolated fine-scale dataset, wherein the first and second interpolation are different interpolations; summing together the interpolated coarse-scale dataset and the interpolated fine-scale dataset which results in a summed interpolated dataset; and displaying at least one image based on the summed interpolated dataset.

According to an embodiment, there is a method for processing seismic data and generating an output associated with the seismic data, the method comprising: processing the seismic data using a dual-scale interpolation; and generating at least one image associated with an output of the processed seismic data.

BRIEF DESCRIPTION OF THE DRAWINGS

The accompanying drawings illustrate exemplary embodiments, wherein.

DETAILED DESCRIPTION

Figure 1:
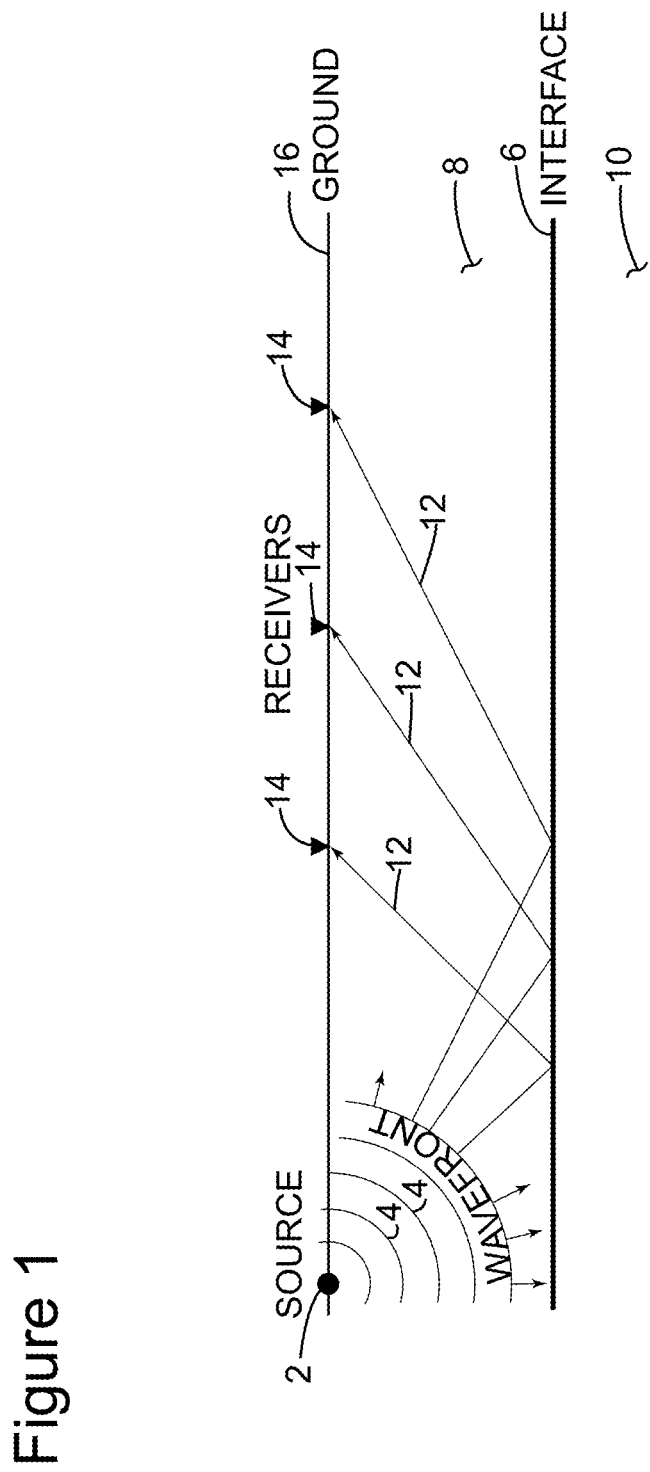
FIG. 1 depicts seismic exploration of subsurface layers.
Figure 2:
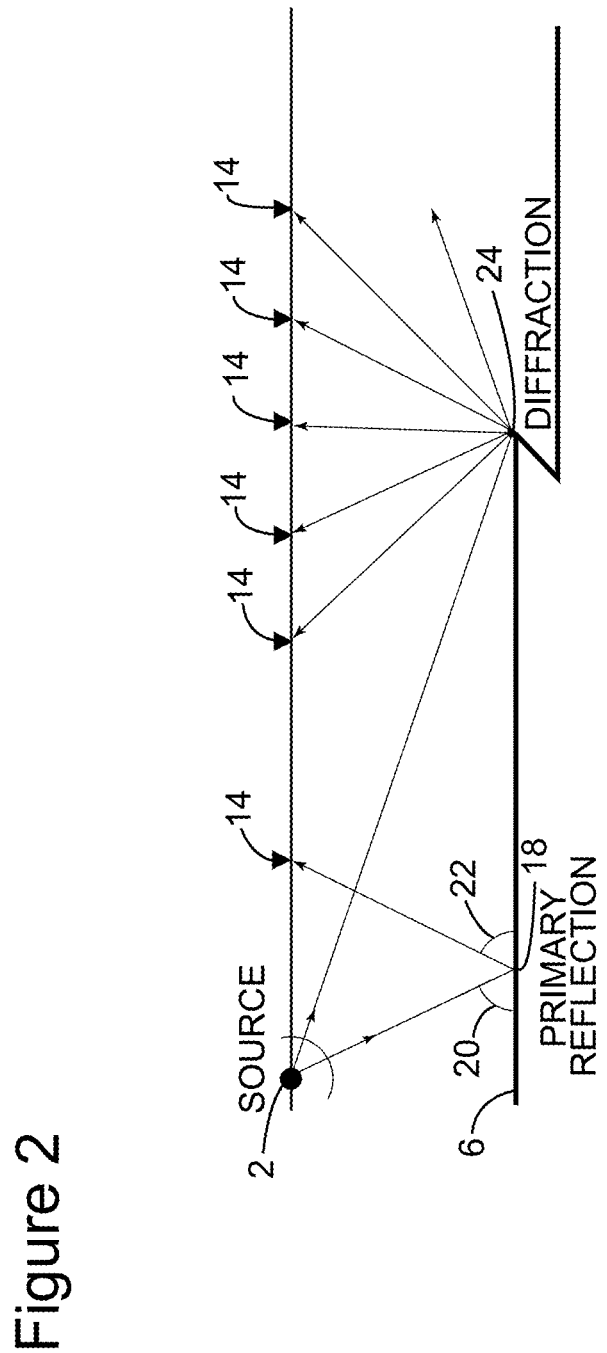
FIG. 2 illustrates primary reflection and diffraction.
Figure 3:
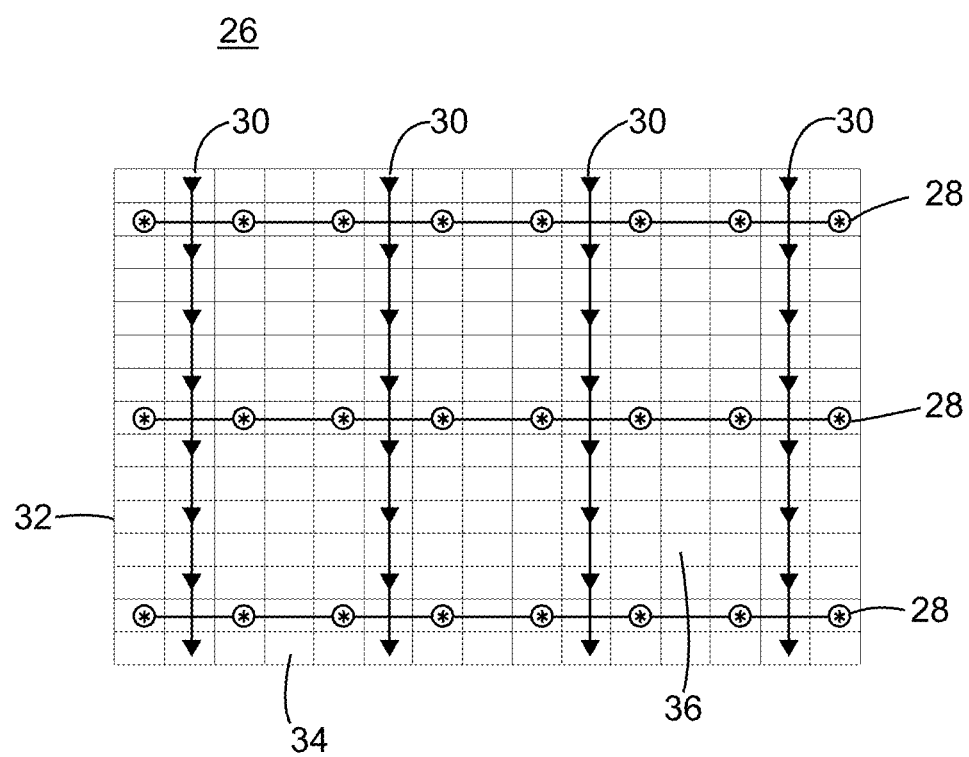
FIG. 3 shows a map view of an orthogonal seismic survey.
Figure 4:
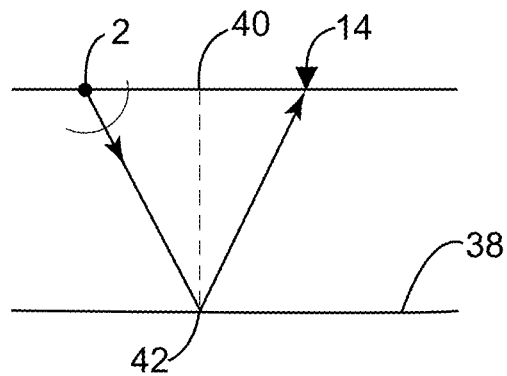
FIG. 4 shows the point of reflection relative to the midpoint when the layer is flat.
Figure 5:
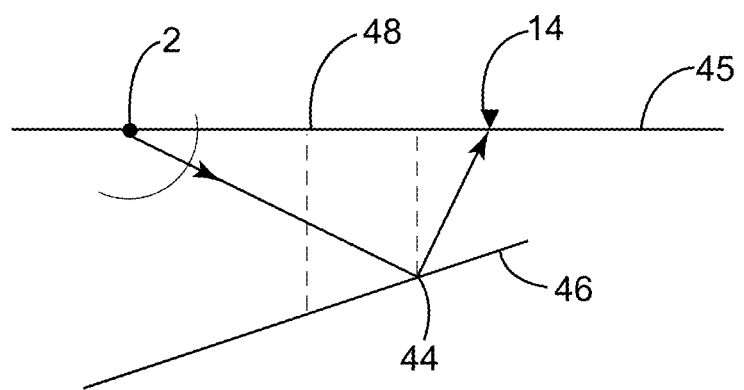
FIG. 5 shows the point of reflection relative to the midpoint when the layer is dipping.
Figure 6:
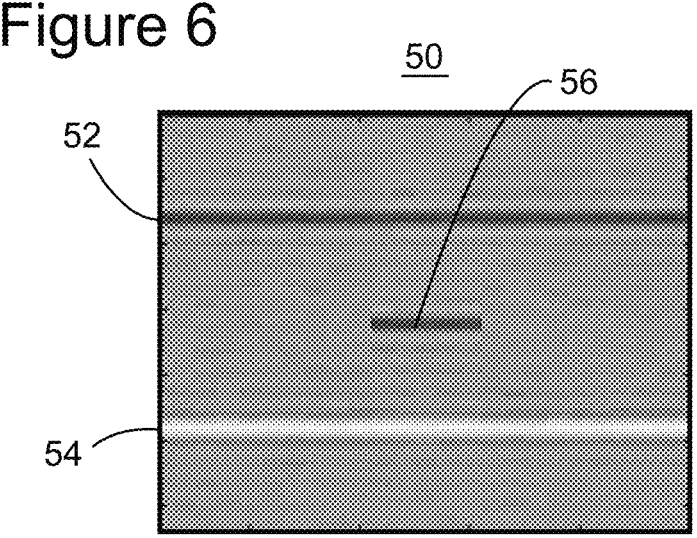
FIGS. 6-9 show different views of a model with two coarse-scale events and one fine-scale event.
Figure 7:
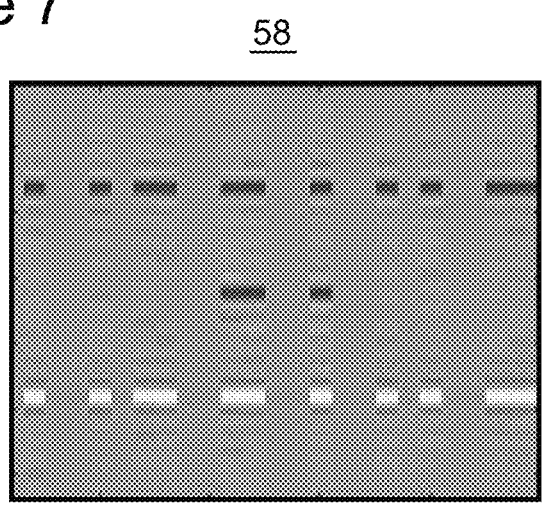
Figure 8:
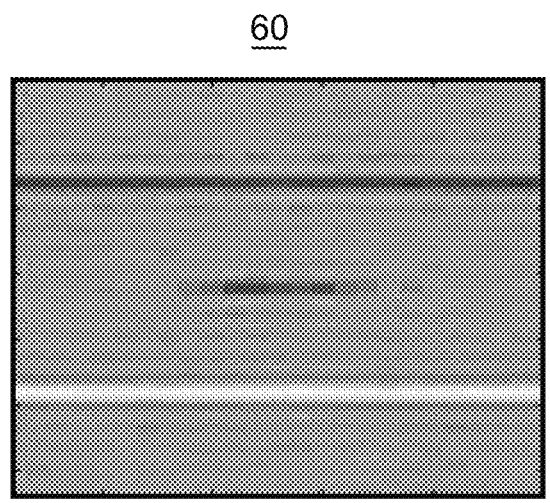
Figure 9:
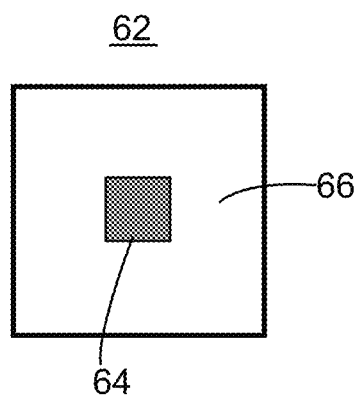

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

According to embodiments, and in order to address, among other things, the problems discussed in the Background, it is desirable to improve interpolation of seismic data. For example, according to an embodiment, a dual-scale interpolation technique is applied to the seismic data which involves, among other things, separating the seismic data into a fine-scale dataset and a coarse-scale dataset, applying a first interpolation to the coarse-scale dataset, applying a second interpolation to the fine-scale dataset, and summing together the interpolated coarse-scale dataset and the interpolated fine-scale dataset which results in a summed interpolated dataset that can be used to generate images of the surveyed geological area of interest. Prior to discussing such embodiments in detail, an environment in which the embodiments described herein can be implemented or used with is now presented.

Figure 10:
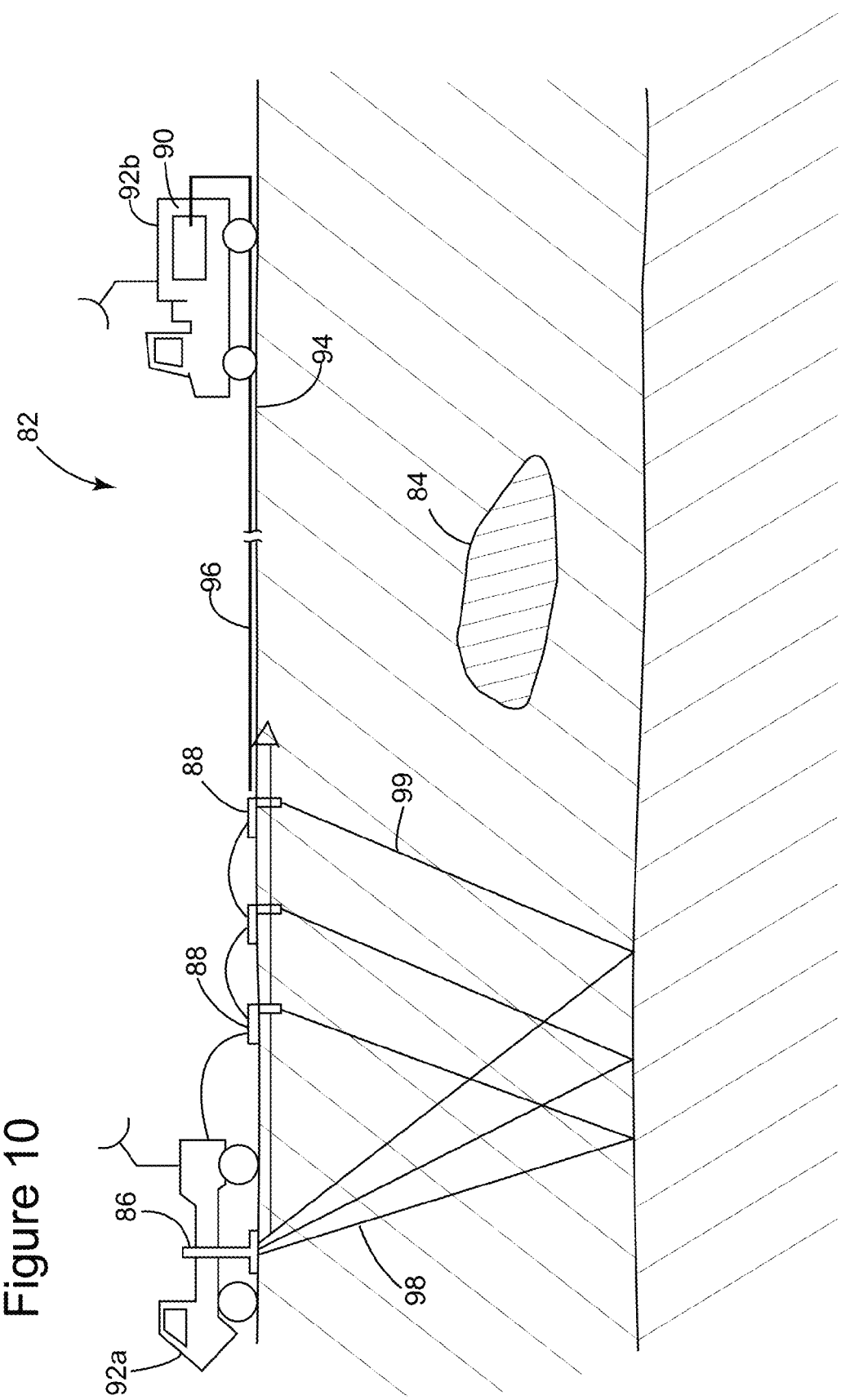
FIG. 10 shows a land seismic survey according to an embodiment.

Embodiments described herein can be used in support of land or marine seismic exploration systems for transmitting and receiving seismic waves intended for seismic exploration. An example of such a land system is shown in FIG. 10. FIG. 10 depicts schematically a land seismic exploration system (system) 82 for transmitting and receiving seismic waves intended for seismic exploration in a land environment. At least one purpose of system 82 is to determine the absence, or presence of hydrocarbon deposits 84, or at least the probability of the absence or presence of hydrocarbon deposits 84. System 82 includes a vehicle/truck 92a which carries a source 86 operable to generate a seismic signal (transmitted waves 98), a plurality of receivers 88 (or geophones) for receiving seismic signals 99 and converting them into electrical signals, and seismic data acquisition system 90 (that can be located in, for example, vehicle/truck 92b) for recording the electrical signals generated by receivers 88. Source 86, receivers 88, and data acquisition system 90 can be positioned on the surface of ground 94, all of which can be interconnected by one or more cables 96. FIG. 10 further depicts a single source 86, but it should be understood that source 86 can be composed of multiple or a plurality of sources 86, as is well known to persons skilled in the art.

Embodiments described herein are not limited to only being used in support of such a system as shown in FIG. 10 but instead can be used in support of other systems and methods which collect seismic data for which the systems and methods associated with interpolation, e.g., five dimensional (5D) interpolation, described herein can improve the quality of the processed data and displayed images. For example, more or fewer receivers and sources could be used. Additionally, 5D interpolation may be used, in some scenarios, for processing and imaging marine seismic data.

Figure 11:
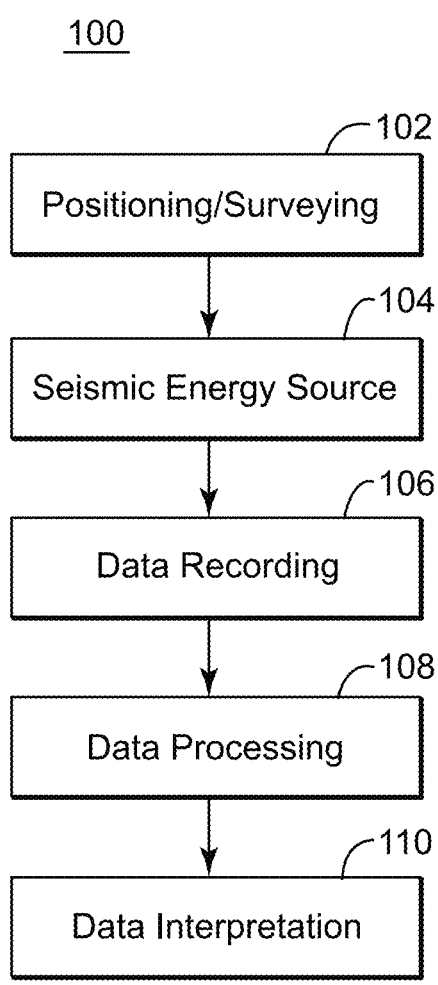
FIG. 11 shows a flowchart of a method according to an embodiment.

Embodiments described herein relate to seismic exploration, and in support of that by improving systems and methods for 5D interpolation of seismic data. The main purpose of seismic exploration is to render the most accurate possible graphic representation of specific portions of the Earth's subsurface geologic structure (also referred to as a Geological Area of Interest (GAI)). The images produced allow for exploration companies to accurately and cost-effectively evaluate a promising target (prospect) for its oil and gas yielding potential, e.g., hydrocarbon deposits. FIG. 11 illustrates a general method for seismic exploration. The seismic exploration method 100 can be broken down into five general process steps and, although a detailed discussion of any one of the process steps would far exceed the scope of this document, a general overview of the process can aid in understanding where the different aspects of the interpolation embodiments described herein can be used.

A method for seismic exploration 100 can include a plurality of steps. At step 102, positioning and surveying of the potential site for seismic exploration occurs to ensure that the GAI will be appropriately shot and recorded during the acquisition. At step 104, seismic signals are transmitted. At step 106, data recording of the reflected waves occurs. In a first part of step 106, receivers receive and most often digitize the data, and in a second part of this step, the data is transferred to some form of a recording station or device. At step 108, data processing occurs. Data processing generally involves enormous amounts of computer processing resources, including the storage of vast amounts of data, multiple processors or computers running in parallel and the like. Among other things, the data processing step 108 can include interpolation to provide reconstructed traces to improve prestack time migration (PSTM) as described above in the Background section. Finally, at step 110, data interpretation occurs and results can be displayed in multiple dimensions, e.g., data can be processed using techniques which use 1, 2, 3 or even 5 dimensions of data, while displays of data can often be found in 2, 3 or 4 dimensional form. For example, a three dimensional (3D) plot or graph over time (the fourth dimension) can be created and displayed.

As described above, it is desirable to improve interpolation of seismic data which can be used to assist in determining the absence or presence of hydrocarbons. According to an embodiment, to address the problem of scale generally described in the Background, a dual-scale interpolation can be applied to the land seismic data (or as described below for marine seismic data). That is, two different interpolation procedures can be used on the seismic data to, for example, reconstruct traces. Fine-scale features can be interpolated using a small spatial window. At the extreme this involves interpolating within single Common-Mid-Points (CMPs). Coarse-scale events can be interpolated using a larger spatial window that contains a full sampling of offsets and azimuths. Therefore, according to an embodiment, for coarse-scale to obtain the desired spatial window enough CMPs are used to span two shot lines in the inline direction and enough CMPs to span two receiver lines in the crossline directions. Alternatively, CMP spacings can be used, e.g., a minimum distance would be half the distance between shot lines and half the distance between the receiver lines, additionally the CMP size can be adjusted to create the desired spatial window based on various factors, such as, irregularity of the shot spacing or skipped shots. Since the distance between shot or receiver lines can be more than a half kilometer, the coarse-scale window is too large for fine-scale events. Thus, for fine-scale interpolation, one could use a 5D interpolation with only three CMPs in the inline and crossline CMP dimensions, but still use all desired offsets/azimuths. Alternatively, one could use a single CMP in the inline and crossline CMP dimensions which makes, in this embodiment, the fine-scale interpolation to be a 3D interpolation. According to an embodiment, for both coarse-scale and fine-scale interpolations the time window is usually between 200 and 500 milliseconds.

Although Cadzow interpolation was used in the example described with respect to FIGS. 6-9, it is to be understood that embodiments described herein are not limited to using only Cadzow interpolation and, instead, that any interpolator capable of 5D, four dimensional (4D) and 3D interpolation can be used.

According to an embodiment, land seismic data is obtained and the data can be separated into two spatial scales, e.g., fine-scale and coarse-scale. According to an embodiment, the separation into a fine-scale dataset and a coarse-scale dataset is a true separation, i.e., both datasets receive and include an amount of the energy which is recorded that is greater than zero. Various methods can be used to generate the coarse-scale dataset. For example, maximum coherency filtering, dip filtering, eigenimage filtering, or simple mixing can be used. The decision as to which technique to use for generating the coarse-scale dataset can be based on the complexity of the data or other reasons as desired. According to another embodiment, techniques for diffraction separation, for example as found in (ZHANG, R., 2005, "Imaging the earth using seismic diffractions by means of Radon transform," CSEG Convention Abstracts, 318-321; KLOKOV et al., 2010, "Separation and imaging of seismic diffractions in dip angle domain", $72^{nd}$ EAGE Conference, Expanded Abstracts) could also be used.

According to an embodiment, the separation of the data can operate in a well-sampled domain which has sufficient spatial span. According to an embodiment, a well-sampled domain which has sufficient span can be a spatial window that is sufficiently large enough such that the two CMP dimensions (inline and crossline) contain enough CMPs to span the distance between the shot and the receiver lines. This provides reasonable certainty that all (or enough) offsets and azimuths have been sampled. In an embodiment, for a land, orthogonal survey, filtering can occur across inline and crossline CMPs in a cross-spread domain, wherein a cross-spread is a subset of an orthogonal survey which includes a single shot line and a single receiver line. The fine-scale dataset can be acquired by subtracting the coarse-scale data from the original data. 5D interpolation can be applied to the coarse-scale dataset in either the common-offset-vector (COV) or common-offset-azimuth configurations.

According to an embodiment, the fine-scale dataset can be interpolated on the same grid as was used for the coarse-scale interpolation. However, the interpolation design window can be very limited in its CMP extent, since this can preserve the spatial resolution. According to an embodiment, this can be performed by using a 3D interpolation within each CMP, where the data is organized by offset-vector coordinate (or offset and azimuth). De-aliasing interpolation can be used for the 3D interpolation within each CMP as data within each CMP may have regularly missing traces.

According to another embodiment, the interpolation design window, specifically the inline and crossline CMP dimensions, which are the two dimensions that capture the geologic structure, for fine-scale interpolation may be only one or three CMPs wide. The choice between one or three CMPs can be data dependent. For example, if the design window is too wide, the fine-scale information can be diluted with data from reflection points far away from the fine-scale feature which in turn weakens the interpolated fine-scale information. Alternatively, in some cases based at least partially on data noise, when using only one CMP for the design window size, the interpolation may not be as good at suppressing noise. Therefore, in the case where the input data is noisy, it may be desirable to use a three CMP window to reduce noise.

According to an embodiment, the two interpolated datasets, i.e., the fine-scale interpolated dataset and the coarse-scale interpolated dataset, are then summed together. After the two interpolated datasets have been summed together, similarly to a conventional 5D interpolation, the resulting dataset can then be fully regularized and prepared for prestack migration.

Figure 12:
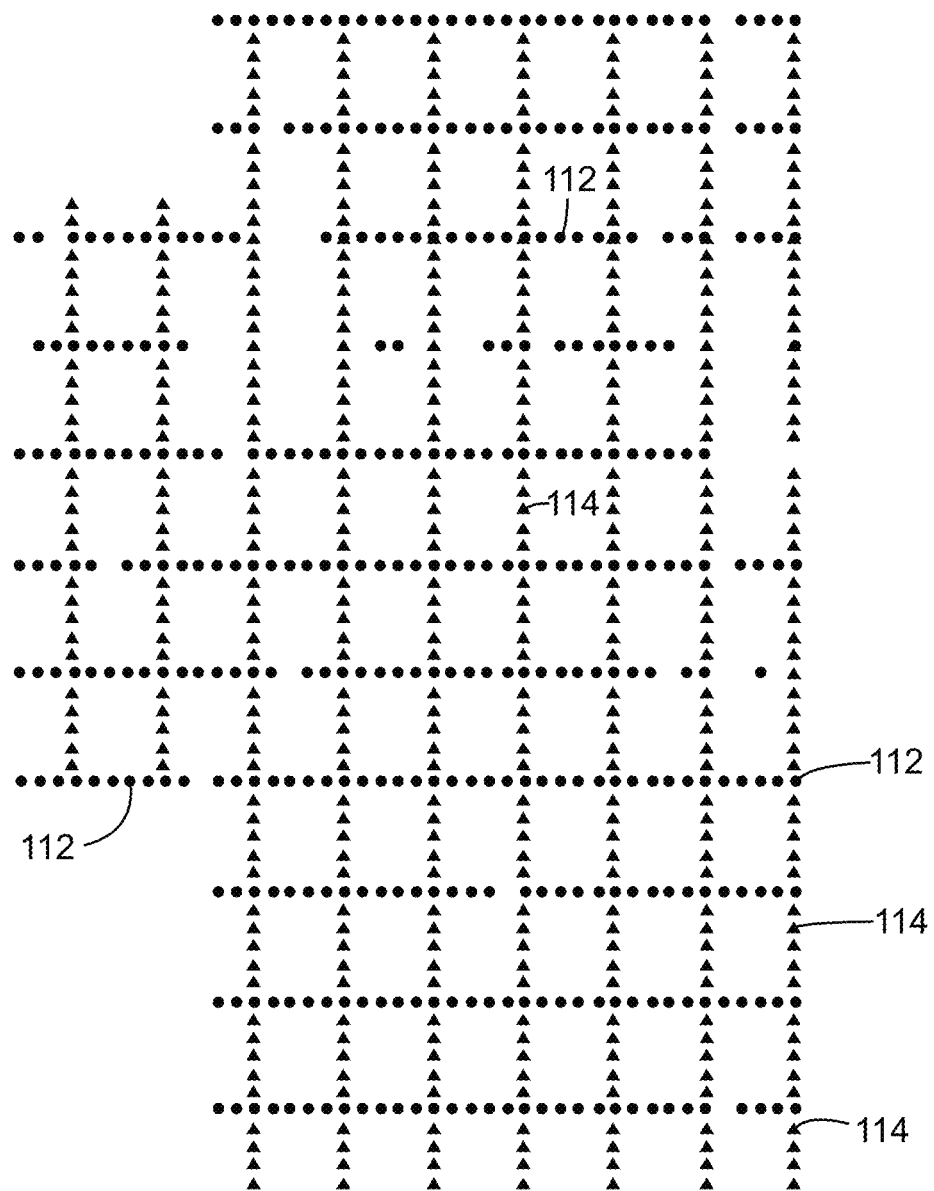
FIG. 12 depicts a shot and receiver layout according to an embodiment.

The above described 5D interpolation embodiments are now described in more detail using a test dataset based on actual acquired data. The acquired data was extracted from an orthogonal subset typical of survey designs in the Western Canadian Sedimentary Basin. FIG. 12 shows the shot and receiver layout for this example. Shots 112 are represented by the dots and the receivers 114 are represented by the triangles. The source and receiver lines were 420 and 350 meters apart respectively. Station spacing was 70 meters, i.e., the receivers are 70 meters apart along the receiver lines and the shots are 70 meters apart along the shot lines. The data was processed on a 35×35 meter CMP grid. The natural offset-vector spacing was 840×700 meters.

According to an embodiment, dual-scale interpolation in the COV configuration was used to achieve regularized data with offset-vector bins of size 420×350 meters. This represents a common scenario of upsampling the data in a manner that mimics a survey acquired with twice as many shot and receiver lines. This results in an approximate quadrupling of the fold, wherein the fold is a measure of the redundancy of CMP data.

Figure 13:
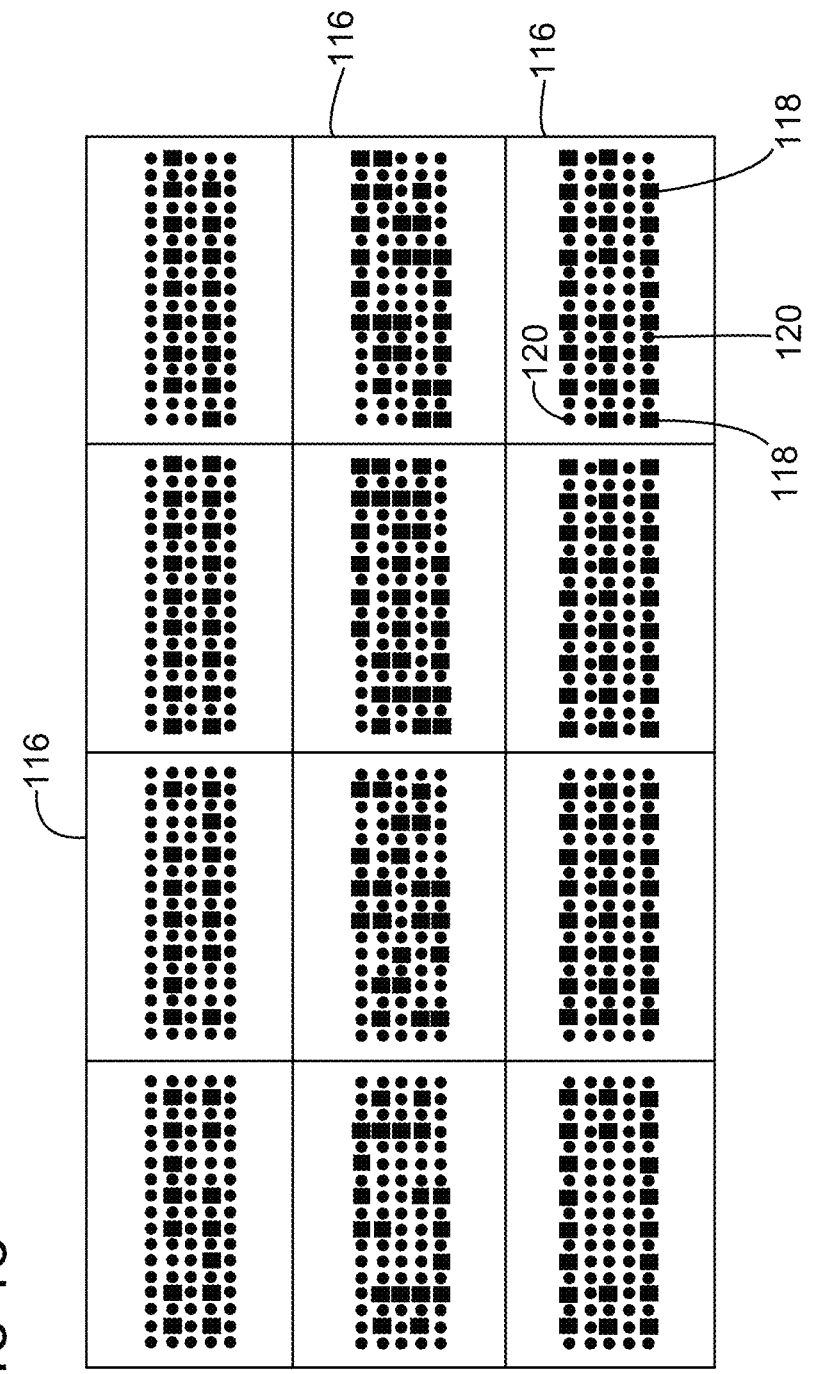
FIG. 13 illustrates a common-offset vector distribution of traces within common midpoints according to an embodiment.

FIG. 13 shows the COV distribution of traces within CMPs 116 using the shot and receiver layout of FIG. 12. Rectangular areas represent CMPs where the points within are organized by inline and crossline offset. The squares 118 represent live traces, and the circles 120 represent traces to be interpolated. According to an embodiment, after interpolation it may be desirable for each CMP 116 to contain traces for seventeen inline offsets and for five cross-line offsets. While traces for seventeen inline offsets and for five cross-line offsets were used in this example, it is to be understood that various other combinations can be used based on, for example, the number of offsets available (i.e., the maximum offset recorded for a 3D survey), the dimensions of the survey, and the distances between shot lines, receiver lines, shot stations and receiver stations to allow for the interpolation to fill in the offsets in every CMP.

In this example, separation of the data was achieved using a gentle dip filter applied within cross-spreads, however, as described above other methods can be used for separating the data. Dip filtering involves identifying a range of dips which are expected to contain useful information about geology in the area of interest. A dip filter is considered to be "harsh" if the dip filter contains a narrow range of dips and "gentle" if the range of the dips is wider than the range expected from the geology.

Figure 14:
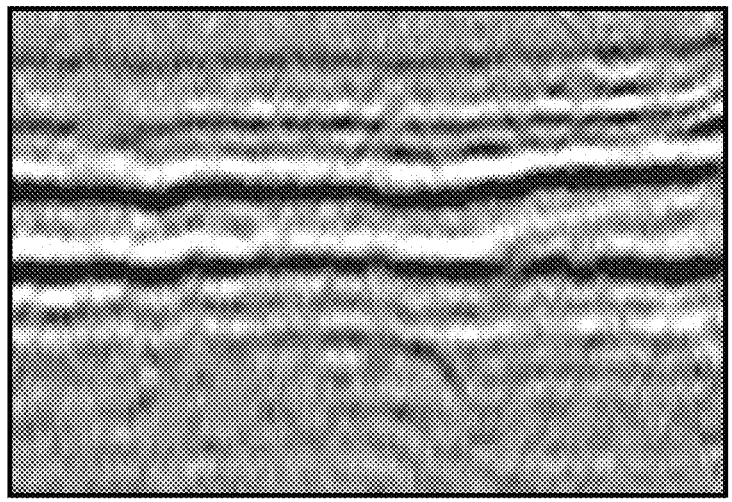
FIG. 14 shows a seismic volume according to an embodiment.
Figure 15:
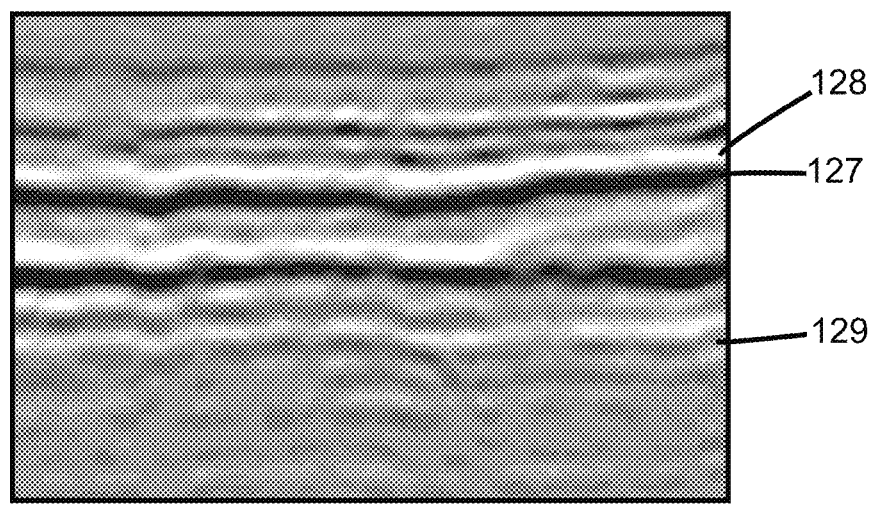
FIG. 15 shows a coarse-scale volume according to an embodiment.
Figure 16:
FIG. 16 illustrates a fine-scale volume according to an embodiment.

According to an embodiment, FIGS. 14-16 show stacks of the original and separated volumes associated with the COV distribution of traces with CMPS 116 of FIG. 13. More specifically, FIG. 14 shows the original seismic volume 122, FIG. 15 shows the coarse-scale volume 124 after separation by dip filtering and FIG. 16 shows the fine-scale volume 126 after removing the course-scale volume 124 from the original seismic volume 122. Note that the vast majority of the energy 128 is seen in the coarse scale volume 124 and not seen in the fine-scale volume 126. Energy is represented in FIGS. 14-16 with the "darker" lines 127 being the peak, the "whiter" lines 128 representing the trough and the grey lines 129 being the low to no energy areas.

According to an embodiment, 5D interpolation was applied to the coarse-scale volume 124. In order to sample all of the offset vectors, interpolation windows contained 11×11 CMPs which roughly spans the distance between neighboring source lines and receiver lines. For the fine-scale volume, 3D de-aliasing interpolation was applied within each CMP. These two interpolations were then summed together prior to PSTM.

Figure 17:
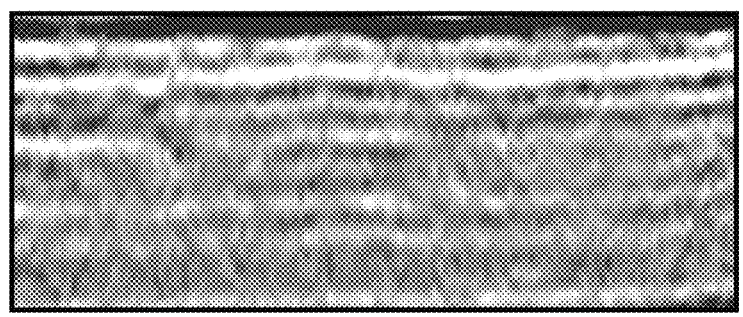
FIG. 17 depicts a stack from a dual-scale interpolation according to an embodiment.
Figure 18:
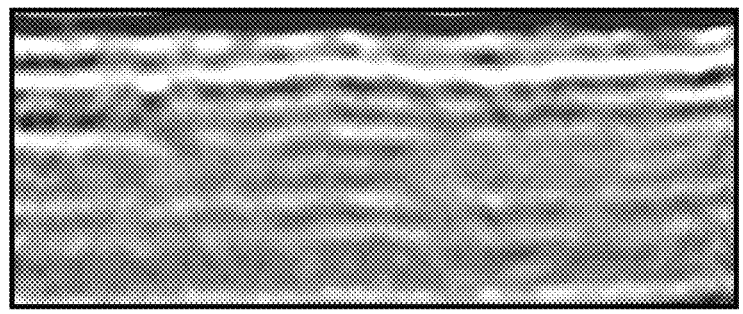
FIG. 18 shows a stack from a conventional five dimensional (5D) interpolation.

According to an embodiment an example of the stack 130 from the conventional interpolation can be seen in FIG. 17. The stack 130 of FIG. 17 can be compared to the stack 132 of only interpolated traces from a dual-scale 5D interpolation shown in FIG. 18. While the stack 132 from the dual-scale interpolation, in this example, is slightly noisier than the stack 130 using conventional 5D interpolation methods, the stack 132 better retains potentially desirable features, e.g., diffractions.

Figure 19:
FIG. 19 illustrates time slices of a stacked volume which had pre-stack time migration (PSTM), but no interpolation.
Figure 20:
FIG. 20 shows time slices of a stacked volume which had PSTM, and conventional interpolation.
Figure 21:
FIG. 21 shows time slices of a stacked volume which had PSTM, and dual-scale interpolation according to an embodiment.

To compare final images, three datasets were prestack migrated: (1) the volume without interpolation; (2) the volume using a conventional 5D interpolation; and (3) the volume using a dual-scale interpolation. Time slices are shown in FIGS. 19-21. FIG. 19 shows the time slices of a stacked volume which had PSTM without interpolation 134. FIG. 20 shows the time slices of a stacked volume with a conventional interpolation 138, and finally, FIG. 21 shows the time slices of a stacked volume which had PSTM and dual-scale interpolation 142. While it may be difficult to see every nuance in these drawings, which are based on images, the PSTM time slice of the volume with the dual-scale interpolation 142, at least for this example, has more detail and sharper features than that of the conventional 5D interpolation (as well as the volume without interpolation). According to an embodiment, although not shown, the dual-scale interpolated CMP gathers can be fully populated with traces appropriate for amplitude versus offset (AVO) analysis, as expected from 5D interpolation.

From the foregoing discussion, it will be appreciated that interpolation can be a useful tool for regularizing data for prestack migration of land seismic data. However, fine-scale and coarse-scale features can place conflicting demands on interpolation parameters. In other words, the desired design windows for fine-scale and coarse-scale interpolation are different and, as such, it may be preferable that the same interpolation technique should not be used to do both the coarse-scale interpolation and the fine-scale interpolation. According to an embodiment, dual-scale interpolation as described above can provide the freedom to address the two scales optimally which can produce results which include the benefits of conventional 5D interpolation, while including sharper images and better retention of various smaller details. This can be of assistance in examining land or marine seismic data in support of the exploration and exploitation of hydrocarbon deposits.

Embodiments described herein have used the terms "5D" and "3D" when describing types of interpolation. According to another embodiment, other numbers of so-called dimensions can also be used. For example, three CMPs could be used in the inline CMP dimension and one CMP used in the crossline dimension. For this example, 4D interpolation would be used, e.g., three spatial dimensions such as inline CMP, offset and azimuth. One item specific to this industry has been generally used herein regarding nD interpolation. In this industry nD interpolation uses n−1 spatial dimensions as the extra dimension refers to either time or frequency neither of which is interpolated.

While the above described embodiments have presented dual-scale interpolation to improve the output of 5D interpolations using land seismic data, embodiments can also use dual-scale interpolation on acquired marine seismic data. An example of a system and an environment for acquiring such marine seismic data will now be described with respect to FIG. 22.

Figure 22:
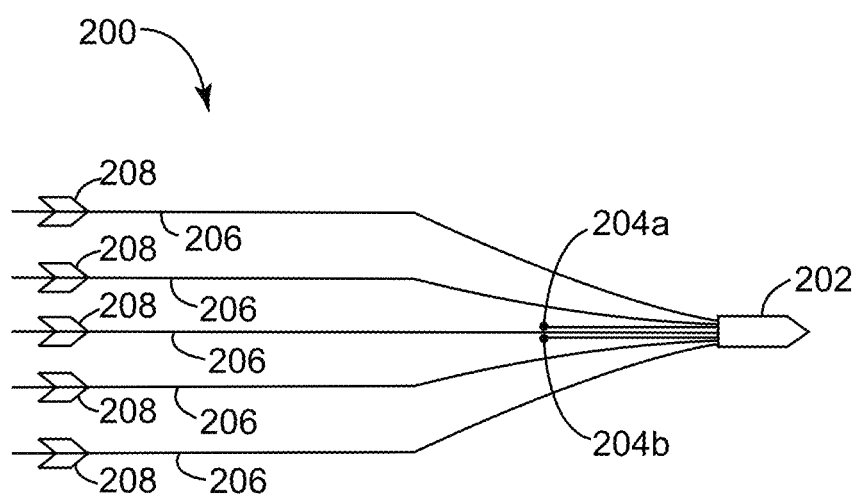
FIG. 22 depicts a marine seismic gather process with a data acquisition system according to an embodiment.

For a seismic gathering process, as shown in FIG. 22, a data acquisition system 200 includes a ship 202 towing plural streamers 206 that may extend over kilometers behind ship 202. Each of the streamers 206 can include one or more birds 208 that maintains streamer 206 in a known fixed position relative to other streamers 206, and the birds 208 are capable of moving streamer 26 as desired according to bi-directional communications the birds 208 can receive from ship 202. One or more source arrays 204a,b may also be towed by ship 202 or another ship for generating seismic waves. Source arrays 204a,b can be placed either in front of or behind receivers, or both behind and in front of receivers. The seismic waves generated by source arrays 204a,b propagate downward, reflect off of, and penetrate the seafloor, wherein the refracted waves eventually are reflected by one or more reflecting structures (not shown in FIG. 22) back to the surface. The reflected seismic waves propagate upwardly and are detected by receivers 210 provided on streamers 206.

Figure 23:
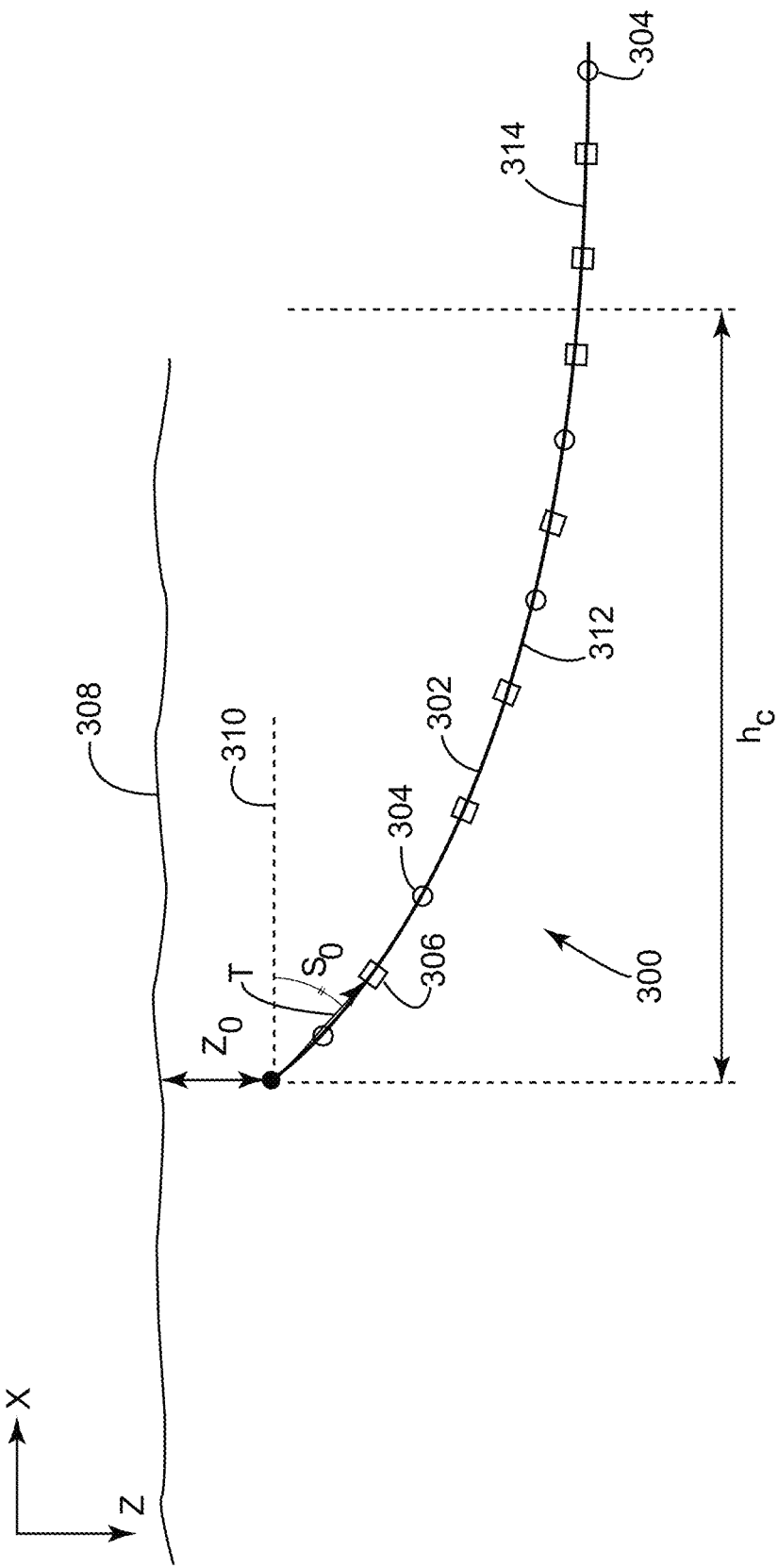
FIG. 23 shows streamers with a curved profile according to an embodiment.

According to an embodiment, streamers may be horizontal or slanted or having a curved profile as illustrated in FIG. 23. The curved streamer 300 of FIG. 23 includes a body 302 having a predetermined length; plural detectors 304 provided along the body 302; and plural birds 306 provided along the body for maintaining the selected curved profile. The streamer 300 is configured to flow underwater when towed such that the plural detectors 304 are distributed along the curved profile. The curved profile may be described by a parameterized curve, e.g., a curve described by (i) a depth $z_0$ of a first detector (measured from the water surface 308), (ii) a slope $s_0$ of a first portion T of the body with an axis 310 parallel with the water surface 308, and (iii) a predetermined horizontal distance $h_c$ between the first detector and an end of the curved profile. It is noted that not the entire streamer has to have the curved profile. In other words, the curved profile should not be construed to always apply to the entire length of the streamer. While this situation is possible, the curved profile may be applied only to a portion 312 of the streamer 300. In other words, the streamer 300 may have (i) only a portion 312 having the curved profile or (ii) a portion 312 having the curved profile and a portion 314 having a flat profile, the two portions being attached to each other.

Figure 24:
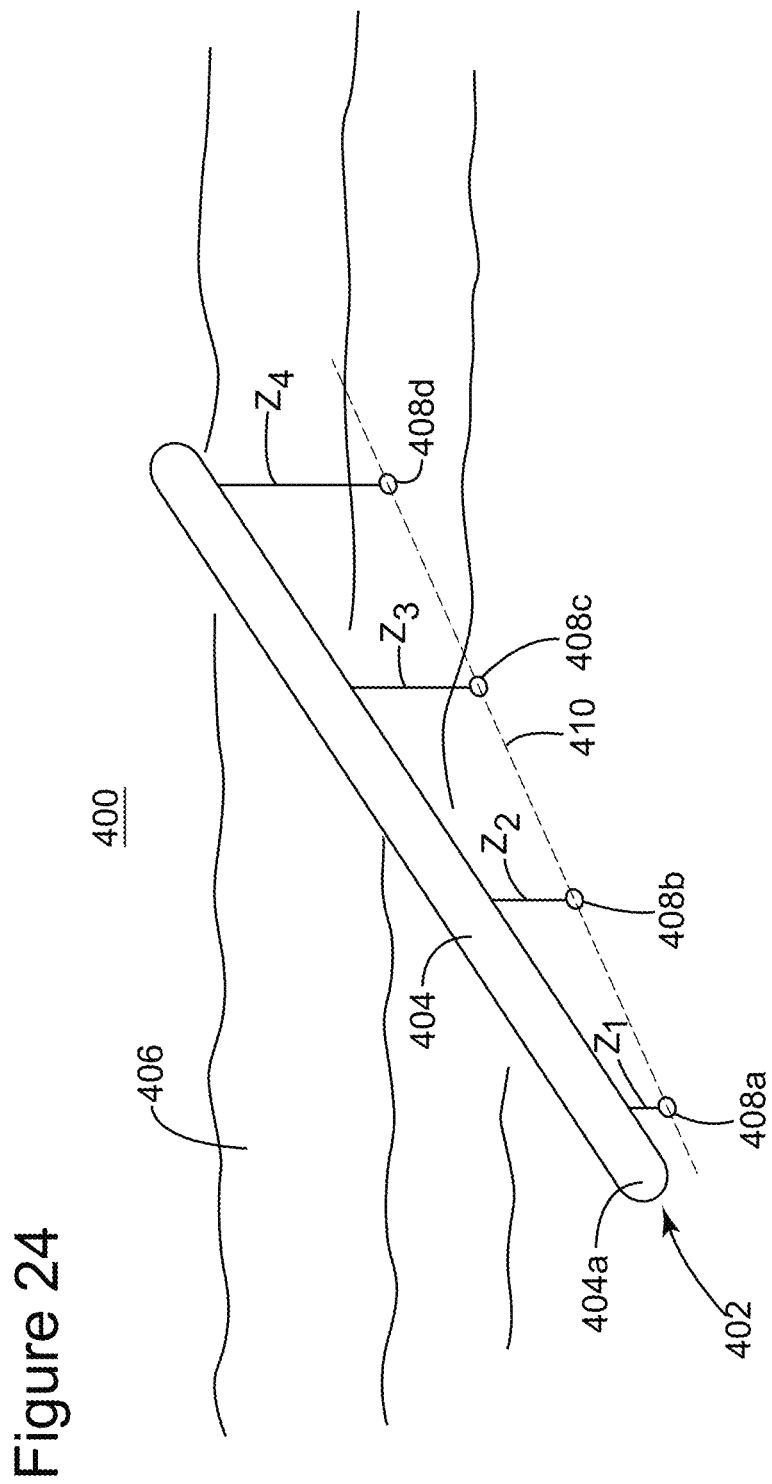
FIG. 24 illustrates a multi-level source according to an embodiment.

According to another embodiment, a multi-level source 400 which can have one or more sub-arrays can be used as is shown in FIG. 24. The first sub-array 402 has a float 404 that is configured to float at the water surface 406 or underwater at a predetermined depth. Plural source points 408a-d are suspended from the float 404 in a known manner. A first source point 408a may be suspended closest to the head 404a of the float 404, at a first depth z1. A second source point 408b may be suspended next, at a second depth z2, different from z1. A third source point 408c may be suspended next at a third depth z3, different from z1 and z3, and so on. FIG. 24 shows, for simplicity, only four source points 408a-d, but an actual implementation may have any desired number of source points. In one application, because the source points are distributed at different depths, the source points at the different depths are not simultaneously activated. In other words, the source array is synchronized, i.e., a deeper source point is activated later in time (e.g., 2 ms for 3 m depth difference when the speed of sound in water is 1500 m/s) such that corresponding sound signals produced by the plural source points coalesce, and thus, the overall sound signal produced by the source array appears as being a single sound signal.

The depths z1 to z4 of the source points of the first sub-array 402 may obey various relationships. In one application, the depths of the source points increase from the head toward the tail of the float, i.e., z1<z2<z3<z4. In another application, the depths of the source points decrease from the head to the tail of the float. In another application, the source points are slanted, i.e., provided on an imaginary line 410. In still another application, the line 410 is a straight line. In yet another application, the line 410 is a curved line, e.g., part of a parabola, circle, hyperbola, etc. In one application, the depth of the first source point for the sub-array 402 is about 5 m and the largest depth of the last source point is about 8 m. In a variation of this embodiment, the depth range is between 8.5 m and 10.5 m or between 11 m and 14 m. In another variation of this embodiment, when the line 410 is straight, the depths of the source points increase by 0.5 m from a source point to an adjacent source point. Those skilled in the art would recognize that these ranges are exemplary and these numbers may vary from survey to survey. A common feature of all these embodiments is that the source points have variable depths so that a single sub-array exhibits multiple-level source points.

Figure 25:
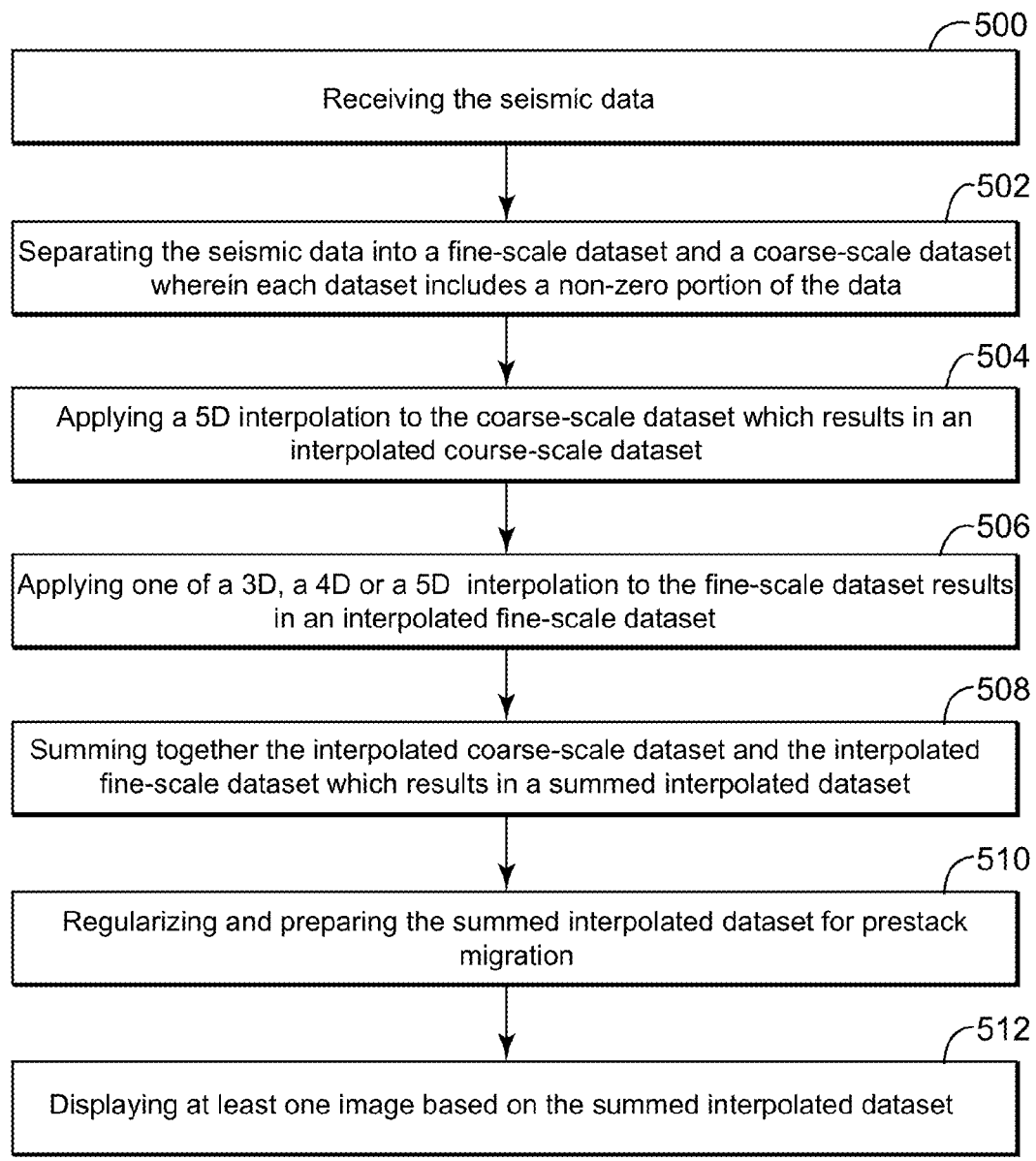
FIG. 25 shows a flowchart of a method according to an embodiment.

Utilizing the above-described systems according to an embodiment, there is a method for processing seismic data and displaying an output associated with the seismic data as shown in FIG. 25. The method includes: at step 500, receiving the seismic data; at step 502, separating the seismic data into a fine-scale dataset and a coarse-scale dataset, wherein each dataset includes a non-zero portion of the data; at step 504, applying a 5D interpolation to the coarse-scale dataset which results in an interpolated coarse-scale dataset; at step 506, applying one of a 3D, a 4D or a 5D interpolation to the fine-scale dataset which results in an interpolated fine-scale dataset; at step 508, summing together the interpolated coarse-scale dataset and the interpolated fine-scale dataset which results in a summed interpolated dataset; at step 510, regularizing and preparing the summed interpolated dataset for prestack migration; and at step 512, displaying at least one image based on the summed interpolated dataset.

Figure 26:
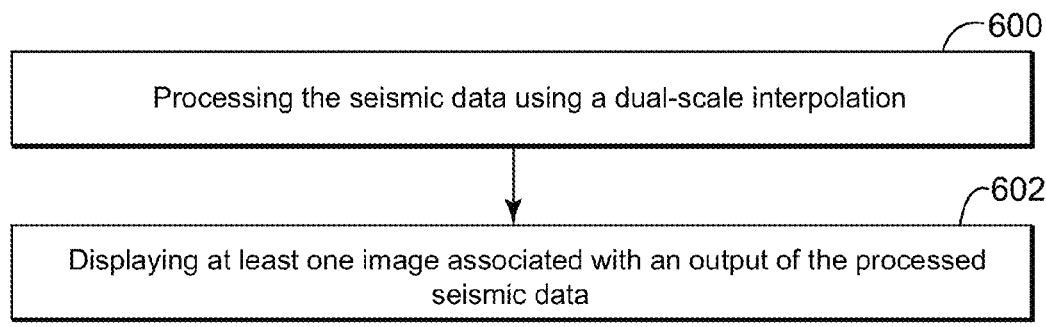
FIG. 26 shows flowchart of another method according to an embodiment.

Utilizing the above-described systems according to an embodiment, there is another method for processing seismic data and displaying an output associated with the seismic data as shown in FIG. 26. The method includes: at step 600, processing the seismic data using a dual-scale interpolation; and at step 602, displaying at least one image associated with an output of the processed seismic data.

According to an embodiment, there is a computing system for processing seismic data and displaying an output associated with the seismic data, the computing system including: an interface configured to receive the seismic data; a processor configured to separate the seismic data into a fine-scale dataset and a coarse-scale dataset wherein each dataset includes a non-zero portion of the data; the processor configured to apply a 5D interpolation to the coarse-scale dataset which results in an interpolated coarse-scale dataset; the processor configured to apply one of a 3D, a 4D or a 5D interpolation to the fine-scale dataset which results in an interpolated fine-scale dataset; the processor configured to sum together the interpolated coarse-scale dataset and the interpolated fine-scale dataset which results in a summed interpolated dataset; the processor configured to regularize and prepare the summed interpolated dataset for prestack migration; and a display configured to display at least one image based on the summed interpolated dataset.

According to an embodiment, there is a computing system for processing seismic data and displaying an output associated with the seismic data, the system comprising: a processor configured to separate the seismic data into a fine-scale dataset and a coarse-scale dataset, wherein each dataset includes a non-zero portion of the data; the processor configured to apply a first interpolation to the coarse-scale dataset which results in an interpolated coarse-scale dataset; the processor configured to apply a second interpolation to the fine-scale dataset which results in an interpolated fine-scale dataset, wherein the first and second interpolation are different interpolations; the processor configured to sum together the interpolated coarse-scale dataset and the interpolated fine-scale dataset which results in a summed interpolated dataset; and a display configured to display at least one image based on the summed interpolated dataset.

Figure 27:
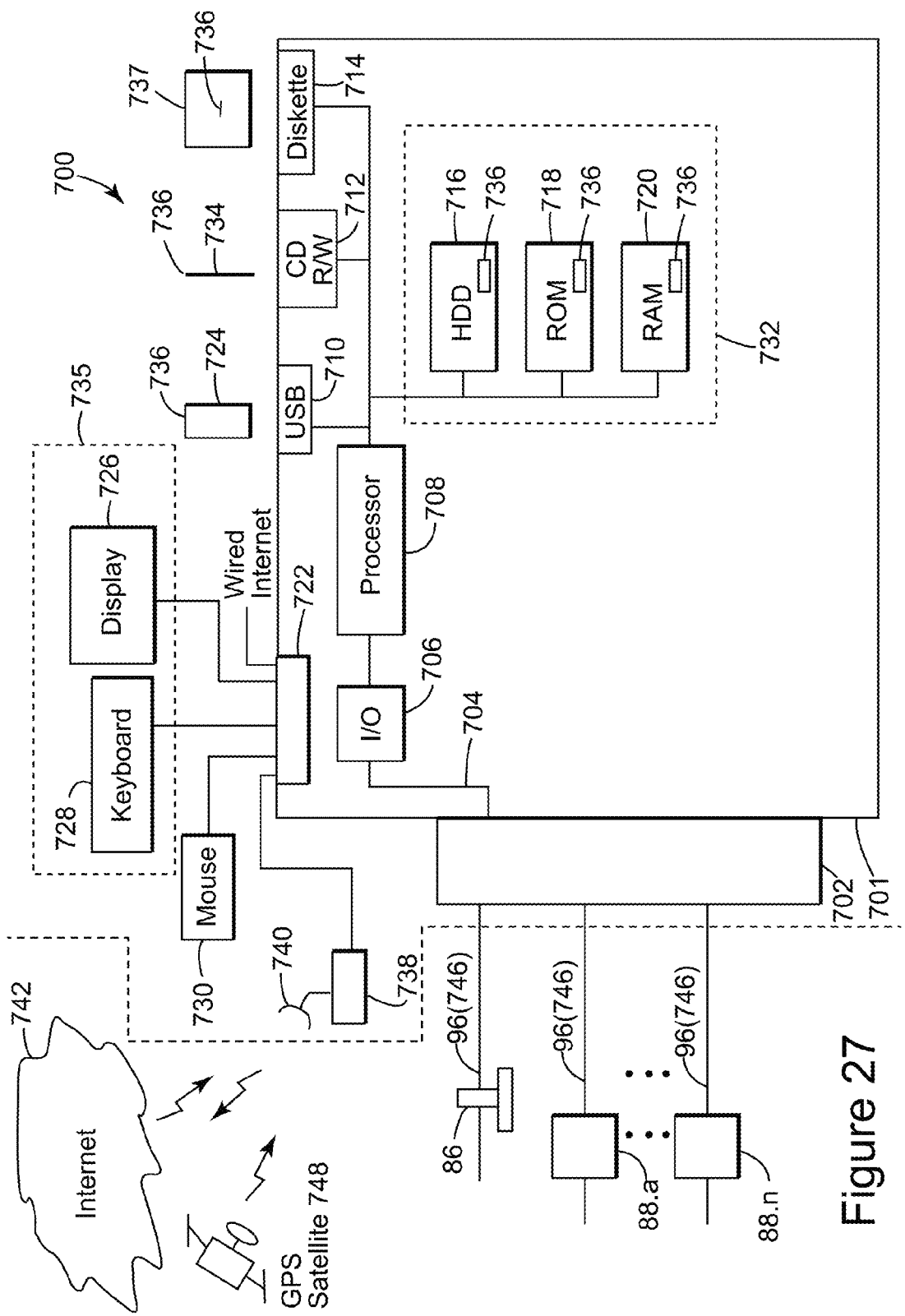
FIG. 27 illustrates a seismic data acquisition system with components according to an embodiment.

FIG. 27 illustrates a seismic data acquisition system (system) 700 suitable for use to implement a method for performing dual-scale interpolation of either land or marine seismic data which can result in an image according to an embodiment. System 700 includes, among other items, server 701, source/receiver interface 702, internal data/communications bus (bus) 704, in input/output interface 706 (optional), processor(s) 708 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 710, compact disk (CD)/digital video disk (DVD) read/write (R/W) drive 712, floppy diskette drive 714 (though less used currently, many servers still include this device), and data storage unit 732.

Data storage unit 732 itself can comprise hard disk drive (HDD) 716 (these can include conventional magnetic storage media, but, as is becoming increasingly more prevalent, can include flash drive-type mass storage devices 724, among other types), ROM device(s) 718 (these can include electrically erasable (EE) programmable ROM (EEPROM) devices, ultra-violet erasable PROM devices (UVPROMs), among other types), and random access memory (RAM) devices 720. Usable with USB port 710 is flash drive device 724, and usable with CD/DVD R/W device 712 are CD/DVD disks 734 (which can be both read and write-able). Usable with diskette drive device 714 are floppy diskettes 737. Each of the memory storage devices, or the memory storage media (716, 718, 720, 724, 734, and 737, among other types), can contain parts or components, or in its entirety, executable software programming code (software) 736 that can implement part or all of the portions of the method described herein. Further, processor 708 itself can contain one or different types of memory storage devices (most probably, but not in a limiting manner, RAM memory storage media 220) that can store all or some of the components of software 736.

In addition to the above described components, system 700 also comprises user console 735, which can include keyboard 728, display 726, and mouse 730. All of these components are known to those of ordinary skill in the art, and this description includes all known and future variants of these types of devices. Display 726 can be any type of known display or presentation screen, such as liquid crystal displays (LCDs), light emitting diode displays (LEDs), plasma displays, cathode ray tubes (CRTs), among others. User console 735 can include one or more user interface mechanisms such as a mouse, keyboard, microphone, touch pad, touch screen, voice-recognition system, among other inter-active inter-communicative devices.

User console 735, and its components if separately provided, interface with server 701 via server input/output (I/O) interface 722, which can be an RS232, Ethernet, USB or other type of communications port, or can include all or some of these, and further includes any other type of communications means, presently known or further developed. System 700 can further include communications satellite/global positioning system (GPS) transceiver device 738 (to receive signals from GPS satellites 748), to which is electrically connected at least one antenna 740 (according to an embodiment, there would be at least one GPS receive-only antenna, and at least one separate satellite bi-directional communications antenna). System 700 can access internet 742, either through a hard wired connection, via I/O interface 722 directly, or wirelessly via antenna 740, and transceiver 738.

Server 701 can be coupled to other computing devices, such as those that operate or control the equipment of vehicles 92a,b, via one or more networks. Server 701 may be part of a larger network configuration as in a global area network (GAN) (e.g., internet 742), which ultimately allows connection to various landlines.

According to a further embodiment, system 700, being ostensibly designed for use in seismic exploration, will interface with one or more sources 86 and one or more receivers 88. These, as previously described, are attached to cables 96. As further previously discussed, sources 86 and receivers 88 can communicate with server 701 either through electrical cable, or via a wireless system that can communicate via antenna 740 and transceiver 738 (collectively described as communications conduit 746) (note that the source, receiver and cable reference numbers refer to the land seismic FIG. 10, but this is not limiting these embodiments to land seismic use only, instead similar marine seismic equipment could also be used herein, but is not also shown for reasons of brevity and clarity).

According to further embodiments, user console 735 provides a means for personnel to enter commands and configuration into system 700 (e.g., via a keyboard, buttons, switches, touch screen and/or joy stick). Display device 726 can be used to show: visual representations of acquired data; source 86 and receiver 88 position(s) and status information; survey information; and other information important to the seismic data acquisition process. Source and receiver interface unit 702 can also communicate bi-directionally with sources and receivers via communication conduit 746 to receive land seismic data and status information related to sources 6 and receivers 8, and to provide excitation signals and control signals to source 6 and receivers 8.

Bus 704 allows a data pathway for items such as: the transfer and storage of data that originate from either the source sensors or streamer receivers; for processor 708 to access stored data contained in data storage unit memory 732; for processor 708 to send information for visual display to display 726; or for the user to send commands to system operating programs/software 736 that might reside in either the processor 708 or the source and receiver interface unit 702.

System 700 can be used to implement methods for processing seismic data and displaying an output associated with the seismic data according to an embodiment. Hardware, firmware, software or a combination thereof may be used to perform the various steps and operations described herein. According to an embodiment, software 736 for carrying out the above discussed steps can be stored and distributed on multi-media storage devices such as devices 716, 718, 720, 724, 734, and/or 737 (described above) or other form of media capable of portably storing information (e.g., universal serial bus (USB) flash drive 724). These storage media may be inserted into, and read by, devices such as the CD-ROM drive 712, disk drives 714, 716, among other types of software storage devices.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide one or more apparatus and methods for improving processing of seismic data.

It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims. No element, act, or instruction used in the description of the present application should be construed as critical or essential to the invention unless explicitly described as such. Also, as used herein, the article "a" is intended to include one or more items.

What is claimed is:

1. A method for exploring structure of an underground formation, the method comprising:
    acquiring seismic data using a seismic source that injects seismic excitations into the underground formation, and receivers that generate the seismic data based on detecting seismic excitations emerging from the underground formation;
    receiving, by an interface, the seismic data;
    separating, by a processor, the seismic data into a fine-scale dataset and a coarse-scale dataset wherein each dataset includes a non-zero portion of the seismic data, so as the coarse-scale dataset carries information about a layer structure of the underground formation, and the fine-scale dataset preserves information about fine-scale features of the underground formation;
    applying, by the processor, a five dimensional (5D) interpolation to the coarse-scale dataset which results in an interpolated coarse-scale dataset;
    applying, by the processor, one of a three dimensional (3D), a four dimensional (4D) or a 5D interpolation to the fine-scale dataset which results in an interpolated fine-scale dataset;
    summing together, by the processor, the interpolated coarse-scale dataset and the interpolated fine-scale dataset which results in a summed interpolated dataset;
    regularizing and preparing, by the processor, the summed interpolated dataset for prestack migration; and
    displaying, by a display, at least one image of the structure of the underground formation based on the summed interpolated dataset, the image enabling an evaluation of presence or absence of hydrocarbon deposits in the underground structure.

2. The method of claim 1, wherein the separating comprises:
    subtracting the coarse-scale dataset from the seismic data to obtain the fine-scale dataset.

3. The method of claim 1, wherein the separating comprises:
    generating the coarse-scale dataset by using one of the following techniques: maximum coherency filtering, dip filtering, eigenimage filtering, simple mixing or diffraction separation.

4. The method of claim 1, wherein the 5D interpolation is applied to the coarse-scale dataset in one of a common-offset-vector (COV) configuration or a common-offset-azimuth configuration.

5. The method of claim 1, wherein the 3D interpolation further comprises:
    de-aliasing interpolation within each common midpoint (CMP).

6. The method of claim 1, wherein a same grid is used for both the fine-scale interpolation and the coarse-scale interpolation.

7. A method for exploring structure of an underground formation, the method comprising:
    acquiring seismic data using a seismic source that injects seismic excitations into the underground formation, and receivers that generate the seismic data based on detecting seismic excitations emerging from the underground formation;
    separating the seismic data into a fine-scale dataset and a coarse-scale dataset, wherein each dataset includes a non-zero portion of the seismic data, so as the coarse-scale dataset carries information about a layer structure of the underground formation, and the fine-scale dataset preserves information about fine-scale features of the underground formation;
    applying a first interpolation to the coarse-scale dataset which results in an interpolated coarse-scale dataset;
    applying a second interpolation to the fine-scale dataset which results in an interpolated fine-scale dataset, wherein the first and second interpolation are different interpolations;
    summing together the interpolated coarse-scale dataset and the interpolated fine-scale dataset which results in a summed interpolated dataset; and
    displaying at least one image of the structure of the underground formation based on the summed interpolated dataset, the image enabling an evaluation of presence or absence of hydrocarbon deposits in the underground structure.

8. The method of claim 7, wherein the separating comprises:
    subtracting the coarse-scale dataset from the seismic data to obtain the fine-scale dataset.

9. The method of claim 7, wherein the separating comprises:
    generating the coarse-scale dataset by using one of the following techniques: maximum coherency filtering, dip filtering, eigenimage filtering, simple mixing or diffraction separation.

10. The method of claim 7, wherein the first interpolation is a five dimensional (5D) interpolation.

11. The method of claim 7, wherein the second interpolation is one of a three dimensional (3D), a four dimensional (4D) or a 5D interpolation.

12. The method of claim 7, wherein the seismic data is land seismic data.

13. The method of claim 7, wherein the seismic data is marine seismic data.

14. A method for exploring structure of an underground formation, the method comprising:
    acquiring seismic data using a seismic source that injects seismic excitations into the underground formation, and receivers that generate the seismic data based on detecting seismic excitations emerging from the underground formation;

processing the seismic data using a dual-scale interpolation so as to obtain a layer structure of the underground formation, and to preserve information about fine-scale features of the underground formation; and generating at least one image of the structure of the underground formation based on the processed seismic data, the image enabling an evaluation of presence or absence of hydrocarbon deposits in the underground formation.

15. The method of claim 14, further comprising:
separating the seismic data into a fine-scale data set and a coarse-scale dataset, wherein each dataset includes a non-zero portion of the seismic data.

16. The method of claim 15, further comprising:
applying a first interpolation to the coarse-scale dataset which results in an interpolated coarse-scale dataset;
applying a second interpolation to the fine-scale dataset which results in an interpolated fine-scale dataset, wherein the first and second interpolation are different interpolations; and
summing together the interpolated coarse-scale dataset and the interpolated fine-scale dataset which results in a summed interpolated dataset.

17. The method of claim 16, wherein the first interpolation is a five dimensional (5D) interpolation and the second interpolation is one of a three dimensional (3D), a four dimensional (4D) or a 5D interpolation.

18. The method of claim 15, wherein the separating comprises:
generating the coarse-scale dataset by using one of the following techniques: maximum coherency filtering, dip filtering, eigenimage filtering, simple mixing or diffraction separation.

19. The method of claim 14, wherein the seismic data is land seismic data.

20. The method of claim 14, wherein the seismic data is marine seismic data.

* * * * *